US008287989B2

(12) United States Patent
Raksha et al.

(10) Patent No.: US 8,287,989 B2
(45) Date of Patent: Oct. 16, 2012

(54) SECURITY IMAGE COATED WITH A SINGLE COATING HAVING VISUALLY DISTINCT REGIONS (75) Inventors: Vladimir P. Raksha, Santa Rosa, CA (US); Roger W. Phillips, Santa Rosa, CA (US); Charles T. Markantes, Santa Rosa, CA (US); Paul G. Coombs, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 493 days.

(21) Appl. No.: 11/784,972

(22) Filed: Apr. 10, 2007

(65) Prior Publication Data
US 2008/0069979 A1    Mar. 20, 2008

Related U.S. Application Data (60) Provisional application No. 60/790,919, filed on Apr. 11, 2006.

(51) Int. Cl.
*B32B 3/00* (2006.01)
(52) U.S. Cl. ............. 428/195.1; 428/206; 428/208; 428/916; 283/82
(58) Field of Classification Search ............ 428/29, 428/195.1, 206, 323, 363, 402, 208, 916; 283/82
See application file for complete search history.

(56) References Cited

U.S. PATENT DOCUMENTS

| | | | |
|---|---|---|---|
| 3,853,676 A | 12/1974 | Graves | 428/207 |
| 4,838,648 A * | 6/1989 | Phillips et al. | 359/585 |
| 5,135,812 A * | 8/1992 | Phillips et al. | 428/403 |
| 5,364,689 A | 11/1994 | Kashiwagi et al. | 428/195 |
| 5,424,119 A * | 6/1995 | Phillips et al. | 428/328 |
| 5,630,877 A | 5/1997 | Kashiwagi et al. | 118/623 |
| 6,243,204 B1 | 6/2001 | Bradley, Jr. et al. | 359/585 |
| 6,294,010 B1 | 9/2001 | Pfaff et al. | 106/415 |
| 6,517,628 B1 | 2/2003 | Pfaff et al. | 106/417 |
| 6,632,275 B1 | 10/2003 | Schoen et al. | 106/404 |
| 6,702,885 B2 | 3/2004 | Schoen et al. | 106/31.9 |
| 6,773,499 B2 | 8/2004 | Schoen et al. | 106/404 |
| 6,838,166 B2 | 1/2005 | Phillips et al. | 428/323 |
| 7,045,007 B2 | 5/2006 | Bagala, Sr. | 106/415 |
| 2002/0160194 A1 * | 10/2002 | Phillips et al. | 428/403 |
| 2003/0143400 A1 | 7/2003 | Phillips et al. | 428/404 |

(Continued)

FOREIGN PATENT DOCUMENTS

| | | |
|---|---|---|
| DE | 2010831 | 9/1971 |
| JP | 57010376 A | 1/1982 |
| JP | 63-175670 | 7/1988 |

*Primary Examiner* — Gerard Higgins
(74) *Attorney, Agent, or Firm* — Matthew A. Pequignot; Pequignot & Myers LLC (57) ABSTRACT A security image is disclosed which is formed from flakes having a first color with flakes having a second different color mixed within a carrier uniformly. The flakes having the second color are magnetically orientable and the flakes having the first color are non-magnetic and do not align or orient in a magnetic field. By exposing at least a single coated region to a magnetic field that is substantially orthogonal to the substrate upon which the coating of flakes is coated, a visible region having the first color is provided as the magnetic flakes are upstanding and the non-magnetic flakes are lying flat upon the substrate. In another region where there is no field applied a visible region having third perceived color different from, however formed from the first color or the second color is seen.

19 Claims, 7 Drawing Sheets
(7 of 7 Drawing Sheet(s) Filed in Color)

U.S. PATENT DOCUMENTS

| | | | |
|---|---|---|---|
| 2004/0028905 A1* | 2/2004 | Phillips et al. | 428/404 |
| 2005/0123764 A1 | 6/2005 | Hoffmann et al. | 428/409 |
| 2006/0198998 A1 | 9/2006 | Raksha et al. | 428/323 |
| 2006/0263539 A1* | 11/2006 | Argoitia | 427/547 |

* cited by examiner

Transparent Gold to Green ColorStream color-shifting mica and opaque Gold non-shifting magnetic pigment at normal observation angle.
(Only one pigment is color-shifting)

Fig 10b

Transparent Green toLilac ColorStream color-shifting mica and opaque Green non-shifting magneticpigment at 30 degrees observation angle.
(Only one pigment is color-shifting)

Fig 10c

Transparent Green toLilac ColorStream color-shifting mica and opaque Gold to Green color-shifting magnetic pigment at normal observation angle.
(Both pigments are color-shifting)

SECURITY IMAGE COATED WITH A SINGLE COATING HAVING VISUALLY DISTINCT REGIONS

CROSS-REFERENCE TO RELATED APPLICATIONS

The present invention claims priority from U.S. Patent Application No. 60/790,919 filed Apr. 11, 2006, which is incorporated herein by reference for all purposes.

FIELD OF THE INVENTION

This invention relates generally to optically variable pigments, films, devices, and images, and more particularly to aligning or orienting magnetic flakes, such as during a painting or printing process, to obtain images for security and decorative applications.

BACKGROUND OF THE INVENTION

U.S. Pat. Nos. 3,853,676; 5,364,689; 6,517,628; 6,632,275; 6,702,885; 6,773,499; 7,045,007; 6,294,010; 6,243,204; 68383166 and US patent applications 2003/0143400, and 2006/0198998 relate to pigments and magnetically aligned pigments.

These patents and applications are incorporated herein by reference for all purposes.

Optically variable devices are used in a wide variety of applications, both decorative and utilitarian, for example such devices are used as security devices on commercial products. Optically variable devices can be made in numerous ways to achieve a variety of effects. Examples of optically variable devices include the holograms imprinted on credit cards and authentic software documentation, color-shifting images printed on banknotes, ID cards, passports and other valuable documents. They can be printed for decorative purposes on such items as motorcycle helmets and wheel covers to enhance their appearance.

Optically variable devices can be made as film or foil that is pressed, stamped, glued, or otherwise attached to an object, and can also be made using optically variable pigments. One type of optically variable pigment is commonly called a color-shifting pigment because the apparent color of images appropriately printed with such pigments changes as the angle of view and/or illumination is tilted. A common example is the "20" printed with color-shifting pigment in the lower right-hand corner of a U.S. twenty-dollar bill, which serves as an anti-counterfeiting device.

Some anti-counterfeiting devices are covert, while others are intended to be noticed. Unfortunately, some optically variable devices that are intended to be noticed are not widely known because the optically variable aspect of the device is not sufficiently dramatic. For example, the color shift of an image printed with color-shifting pigment might not be noticed under uniform fluorescent ceiling lights, but more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetic pigments that are aligned with a magnetic field after applying the pigment, typically in a carrier such as an ink vehicle or a paint vehicle, to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing a pattern of flaked magnetic particles in fluoropolymer matrix has been described. After coating a product with a composition in liquid form, a magnet with a magnetic field having a desirable shape was placed on the underside of the substrate. Magnetic flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer, while the reoriented flakes did not, providing the appearance of a three dimensional pattern in the coating.

It is an object of this invention to provide additional features to images formed of magnetically orientable flakes by combining flakes having different properties and features within a same image.

It is a further object of this invention to utilize a mixture of flakes having a first color with flakes having a second different color mixed within a carrier to create a visible region having the first color and a visible region having third perceived color different from, however formed from the first color or the second color. It is an object of this invention to achieve this further object by utilizing magnetic and non-magnetic flakes and exposing at least a single coated region to a field that is substantially orthogonal to the substrate upon which the coating of flakes is coated.

SUMMARY OF THE INVENTION

In accordance with the invention security device is provided comprising: a coating forming an image having a first region and a second region visually distinguishable from the first region and adjacent thereto coated upon a substrate, wherein the coating is an ink or paint and wherein the coating is comprised of a plurality of magnetically orientable flakes of a first hue and a plurality of other flakes of another distinguishably different hue that are non-orientable in a magnetic field; wherein the concentration of the flakes within the first region and second region is substantially the same, wherein magnetically orientable flakes within the first region are aligned so as to be substantially upstanding on or with respect to the substrate such that sides of the magnetically orientable flakes cannot be seen when viewing the image and wherein the non-orientable flakes in the first region are substantially orthogonal to the substantially upstanding magnetically orientable flakes such that the non-orientable flakes are lying flat upon and parallel to the substrate so that sides of the non-orientable flakes within the first region can be seen when viewing the image, and wherein the magnetically orientable flakes and non-orientable flakes within the second region are substantially parallel to the substrate so as to lying flat upon the substrate and wherein sides of the orientable flakes and non-orientable flakes within the second region can be seen within the second region when viewing the image, wherein a difference in appearance due to the orientation of the magnetically orientable flakes in the first region and the second region forms a visible contrast.

In accordance with the invention a method for forming an image is provided comprising the steps of:

coating a first and second region of a substrate in a single coating step with a coating of ink or paint having flakes therein within a carrier, wherein the flakes can be seen through the carrier, and wherein the flakes comprise magnetically orientable flakes and non-magnetic flakes substantially uniformly distributed within the ink or paint; and, applying a magnetic field to only one of the first and second regions, wherein the field is orthogonal to the substrate so that all or most of the magnetically orientable flakes exposed to the magnetic field stand up on the substrate exposing their edges and not their faces, and wherein most or all of the non-magnetic flakes remain lying substantially flat upon the substrate in both the first and second regions so that their face is exposed.

In accordance with another aspect of the invention an image is provided comprised of a single coating layer of magnetic and non-magnetic flakes fixedly disposed within an at least partially light transmissive binder, wherein the coating is substantially uniform such that the magnetic and non-magnetic flakes are evenly distributed throughout the single coating layer, and wherein the magnetic flakes within a first region of the image are all aligned so to be upstanding and vertical to the substrate exposing an edge of the each upstanding flake and wherein the non-magnetic flakes within the same region are substantially parallel to the substrate and orthogonal to the upstanding magnetic flakes, and wherein the magnetic and non-magnetic flakes in an adjacent second region are all substantially flat lying and parallel to the substrate, wherein a contrasting difference in color is seen between the first region and the second region. In some cases, the color difference is seen as a difference in hue.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments of the invention will now be described in accordance with the invention in which:

FIG. 1b is a color travel plot showing the color travel within FIG. 1a.

DETAILED DESCRIPTION

Within the following description the terms magnetic flakes and non-magnetic flakes are used. For all intents and purposes the term magnetic flake is a flake that will be affected by a magnetic field and aligned or oriented by a magnetic field it is exposed to. The flake itself may or may not be a magnet.

The term non-magnetic flake is a flake that is not affected when placed within a magnetic field; thus its orientation or alignment will not change or be influenced by a magnetic field. Within this description magnetic flakes are described as being perpendicular to the substrate they are supported by, or lying flat upon the substrate and parallel thereto; however slight variations may occur due to the field not being perfectly orthogonal to the substrate or due to flakes resting upon other flakes, and this invention is meant to include minor variations. Notwithstanding, in an ideal image, the upstanding flakes would be at exactly 90 degrees to the substrate and the flat lying flakes would be perfectly parallel to the substrate. When flakes are aligned so as to be upstanding on the substrate their edges are visible, however not seen due to their small size. When flakes are parallel to the substrate their faces are visible and color is seen from reflection from their surfaces.

Figure 3A:
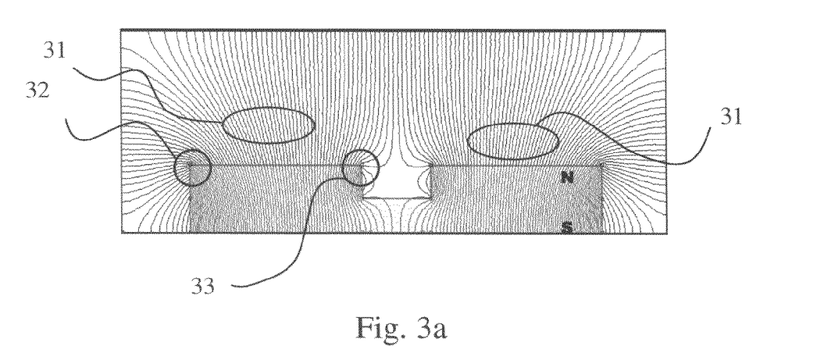
FIG. 3a is a cross sectional view of the magnet and the field emanating from the magnet of FIG. 2.
Figure 3B:
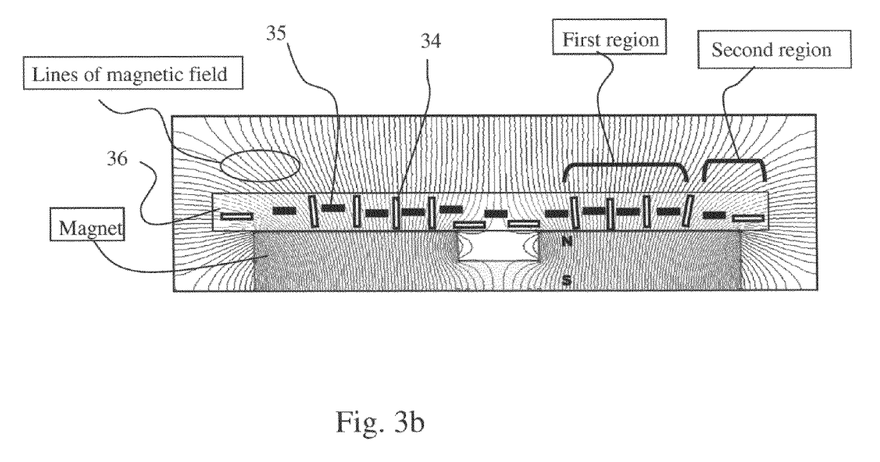
FIG. 3b is a cross sectional view of the magnet showing the orientation of magnetic and non-magnetic flakes.

The magnetic and/or non-magnetic flakes may be single layer flakes, multilayer flakes, color shifting flakes, diffractive flakes, pearlescent flakes or flakes having other special features such as covert flakes having covert symbols thereon. Furthermore the non-magnetic flakes may be semi-transparent. In one embodiment the magnetically non-orientable flakes are substantially transparent and wherein the magnetically orientable flakes are substantially opaque. In one embodiment, at least some of the flakes are color shifting multilayer flakes. The magnetic and/or non-magnetic flakes are shown in FIG. 3b to be substantially planar flakes, each having two flat sides separated by thin edges defined by the thickness of the flake.

We have discovered that when two platelet-like pigments, are blended together, wherein one is magnetic and the other is non-magnetic, mixed with a liquid resin binder, coated on the surface of a substrate and placed in the field of a magnet, the magnetic particles align themselves along magnetic lines of the field without tilting nearby located non-magnetic particles in the same direction. Thus the orientation of the non-magnetic flakes is essentially unaffected by the influence of the aligned magnetic flakes. We have demonstrated that when the concentrations of these pigment flakes are relatively high, that the alignment of the magnetic pigment flakes within a field has little or no effect on the non-magnetic pigment flakes within the mixture.

In view of this discovery we have repeatedly formed images useful for security devices and for other applications that have not heretofore been seen.

A novel aspect of this invention is that magnetic flakes of a first color have been combined with non-magnetic flakes with a substantially different second color to yield an image that when viewed shows a region substantially matched in color to the second color and a region which is not matched to the first color, but is a blend, or "average," of the first color and the second color forming a third different color formed additively from the very small flakes exhibiting first and second colors. The perceived color of the first region matches the color of the non-orientable flakes and that the perceived color of the second region matches the color of blended non-orientable and magnetically orientable flakes. In other words, when a hue of the magnetically orientable flakes and a hue of the non-orientable flakes are substantially different and the faces of the magnetically orientable flakes have a first color and the faces of the magnetically non-orientable flakes have a second color visually distinguishable from the first color, a color seen in the first region is the second color. Alternatively, the magnetic flakes and non-magnetic flakes may have a same color. One of the first and second regions forms a logo, insignia or text.

Figure 1A:
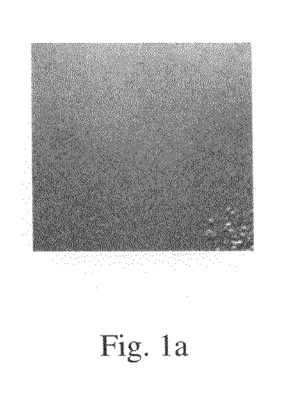
FIG. 1a is a substrate coated with ink containing a blend of pigments.

Turning now to FIG. 1a, a simple image is provided having no variation and consisting of a coated substrate coated with a blend of pigments (13.3 wt. % of Green magnetic pigment and 6.6 wt. % of Magenta/Gold non-magnetic pigment) was mixed with an ink vehicle and silk screen printed on the paper substrate.

Figure 1B:
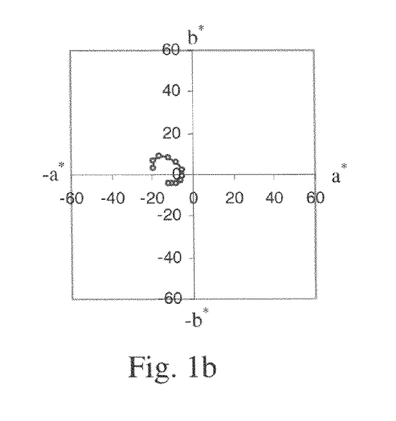

FIG. 1b shows the color travel within this image illustrating the small curve of color travel in a green region at low lightness.

Figure 1C:
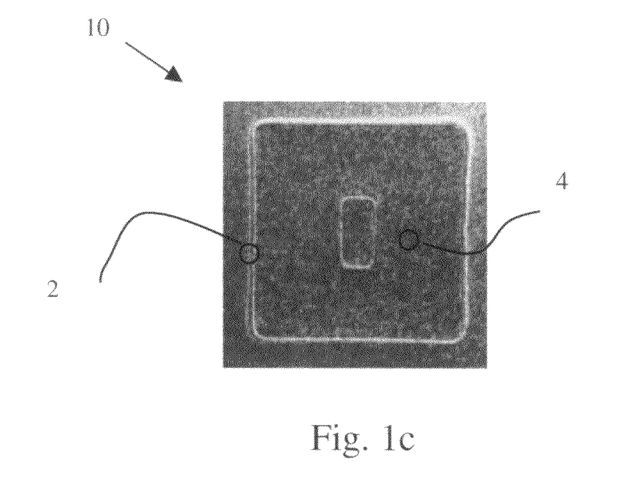
FIG. 1c is an image in accordance with an embodiment of the invention having a same coating of flakes applied to the substrate wherein after magnetic alignment two different colors are visible in different regions as a function of alignment of some of the flakes.

Referring now to FIG. 1c, an image 10 in accordance with this invention is shown, wherein a first region 2 in the form of a line forming a border around a second region 4, which appears darker than the first region; in other words the first region 2 encloses the second region 4. Surprisingly, both the first region 2 and the second region 4 are formed in a single coating step of the same formulation of flakes having the same composition and concentration. In fact a single coating of ink having magnetic flakes and non-magnetic flakes is spread upon the substrate under the image 10 used to form the image which includes the first region 2 contiguous with the second region 4. Differences in color between the first region 2 and the second region 4 are purely a function of differences in the alignment of the flakes within the two regions. Prior to applying a magnetic field through the substrate the entire image was uniform with no distinction between the first and second regions. Before the magnetic field was applied the entire image had the appearance of region 4. In general, one of the first and second regions may be made to form a border enclosing the other region, wherein a color of the second region is substantially darker or substantially lighter than a color of the first region. The area of the first region may be made substantially smaller than the area of the second region.

The blend of flakes in a first sample used to form the image shown in FIG. 1c consists of a standard interference Magenta/Gold (6.6 wt %) non-magnetic pigment and Green interference magnetic pigment (13.3 wt %) was dispersed in Sericol ink vehicle, silk screen printed on the paper substrate, placed on the top of the magnet (FIG. 2), aligned in the field of the magnet and UV cured. The resulting image of the print is shown in FIG. 1c. It is preferred for the ratio of magnetic to non-magnetic flakes to be at least 1 and preferably greater. Thus, a higher concentration of magnetic flakes than non-magnetic flakes is preferred and a ratio of the magnetic flakes to the non-magnetic flakes should be at least 2:1.

Figure 2:
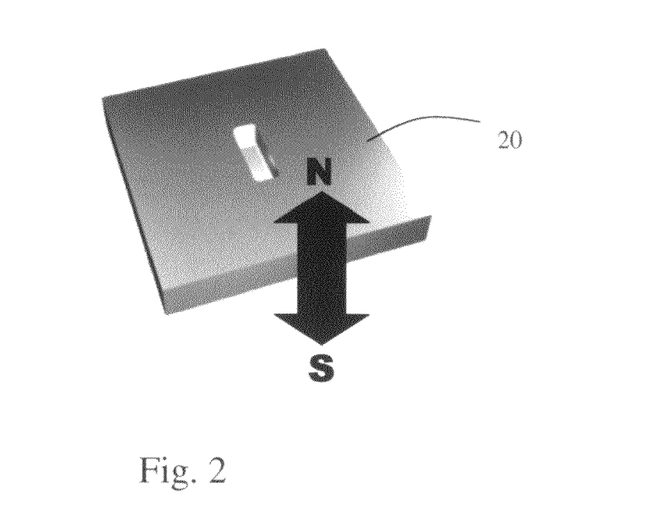
FIG. 2 is a perspective view of a magnet used to form the image in FIG. 1c.

Turning now to FIG. 2, a magnet 20 is shown having a grooved section in the center that was used to form the image 10 shown in FIG. 1c. The field lines as shown by the arrow N-S are substantially normal to the flat surface of the magnet which is required to have flakes within the field be upstanding if the magnet is placed as shown beneath the substrate of the image 10. A more detailed drawing of a cross-section of the field emanating from the magnet is shown in FIG. 3a. Vertical lines 31 in the cross-section of the field correspond to the flat area of the magnet where magnetic particles are vertical to the substrate. Many of lines 32 and 33 around the edges of the magnet are parallel to the substrate. Magnetic particles are aligned parallel to the substrate in these regions. Following these lines, magnetic particles form a pattern repeating a contour of the magnet schematically shown in FIG. 4. Color measurements were conducted in the areas 41 and 42 of the samples. Of course other magnets may be used, as long as the field provides a force that will orient the magnetically alienable flakes to be upstanding vertically, orthogonal to the substrate. It should be noted that the magnet has approximately 80% of its field lines propagating through the substrate vertical to the substrate. It would be preferable to have essentially all of the field lines orthogonal to the substrate, and desired to have at least 60% of the field be orthogonal to the substrate to maximize upon the desired effect.

FIG. 3b flakes shows flakes larger then they are to clearly illustrate the orientation of magnetic and non-magnetic flakes, the magnetic flakes 34 are essentially vertical with a very slight tilt off the vertical as the field slightly varies. The non-magnetic flakes 35 shown between upstanding magnetic flakes and are horizontal and parallel to the substrate. The flakes are fixed in a light transmissive UV curable binder.

Figure 5A:
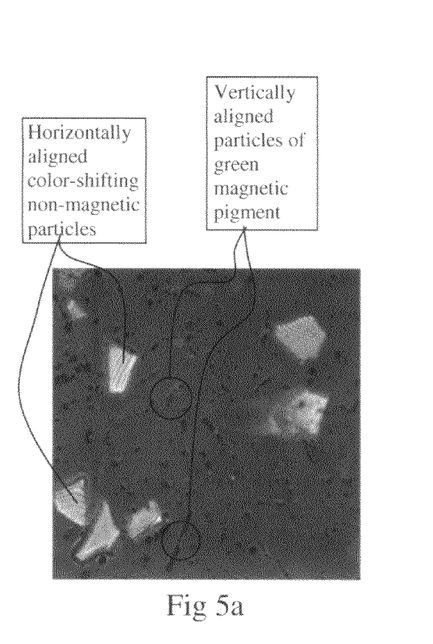
FIGS. 5a and 5b are microscopic photographs showing different flake alignment in the two regions of FIG. 1c wherein in FIG. 5A the magnetic flakes are upstanding and in FIG. 5B the magnetic flakes are lying flat parallel to the substrate.
Figure 5B:
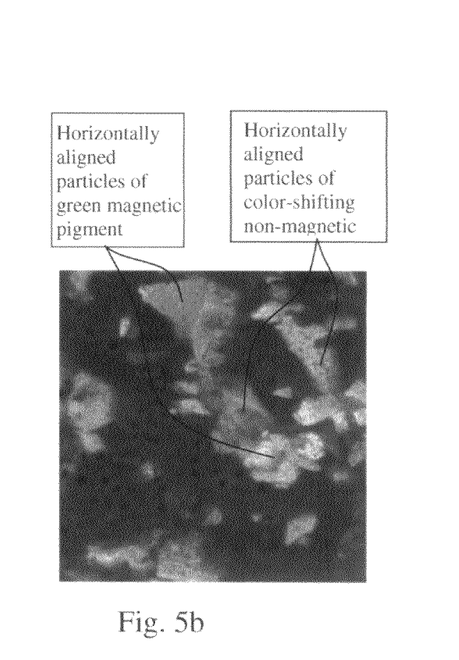
Figure 6A:
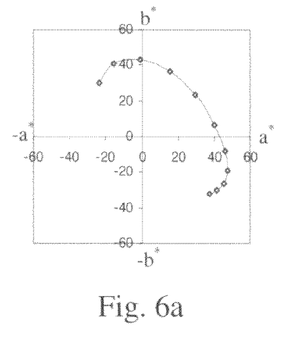
FIGS. 6a and 6b are color travel curves for the regions of the photographs shown in FIGS. 5a and 5b respectively.
Figure 6B:
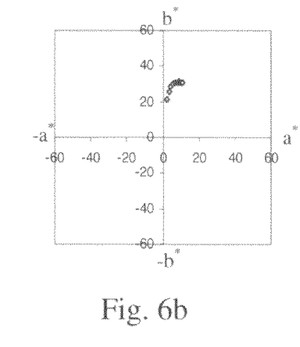

FIGS. 5a and 5b are microscopic photographs of different areas of the image shown in FIG. 1. FIG. 5a represent a microscopic photograph in the region 4 of the sample shown in FIG. 1. Photograph 5b shows area 2 of the same sample. FIGS. 6a and 6b are color-travel curves in these areas: FIG. 6a shows color travel of non-magnetic pigment in the area 4 and the FIG. 6b represents the additive color travel of the magnetic and non-magnetic pigments in the area 2. The green magnetic pigment was fabricated by vacuum deposition of multilayered interference structure with a central layer made from a magnetic material. The color shift of the structure is very small and it occurs in a single or in two quadrants of the color space that gives visual perception of a single color by a naked eye when the observation angle is changed. The color travel plot indicates some shift in the magnetic non-shifter however, this shift is almost non-detectable by the naked eye and it occurs in the color space in area of one single color.

Figure 4:
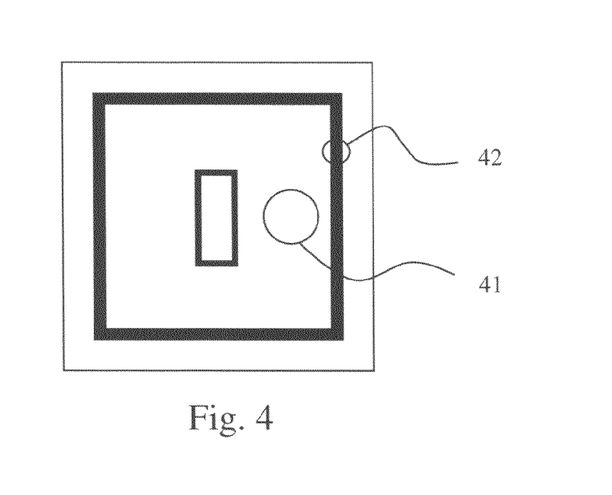
FIG. 4 shows the pattern of differentiation in the image of FIG. 1c caused by the magnet of FIG. 2.

The microscopic pictures reveal that green magnetic particles are invisible (FIG. 5a) in the area 41 of FIG. 4 where the lines of the field are vertical. The magenta/gold color (FIG. 6a) of the sample in this area is formed by the color of horizontally aligned magenta/gold non-magnetic particles shown in FIG. 5a. Microscopic analysis of the area 5b indicates (FIG. 5b) that green magnetic particles are present in the quantity large enough to change the color of the print (FIG. 5b).

Figure 7:
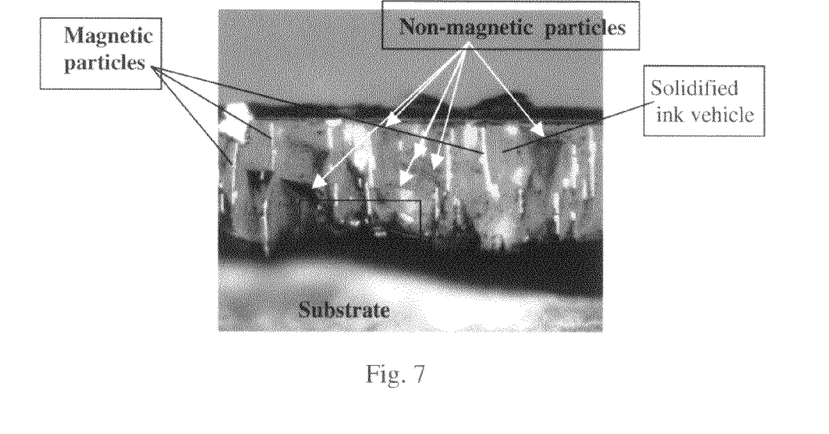
FIG. 7 is a cross sectional microphotograph of the particles showing the upstanding vertical magnetic flakes and the flat lying non-magnetic flakes.

FIG. 7 is a cross-sectional view illustrating that the magnetic particles in the area 42 of FIG. 4 are horizontal. The area 41 of the image in FIG. 4 where the magnetic particles are purposely oriented to be vertical to the substrate are aligned in this manner so that these particles are essentially invisible to the viewer of the image. When the particles are vertical or upstanding only their very thin edges are visible and these are not seen without magnification. It is the effect of the flat lying non-magnetic flakes that is visible. In this manner one essentially eliminates the presence of the magnetic flakes as one would switch off a light yet the non-magnetic flakes remain "on" or visible. Thus in this region where the magnetic field was applied, the color of the non-magnetic flakes becomes dominant, even though the ratio of magnetic to non-magnetic flakes is greater than 1.

Figure 8:
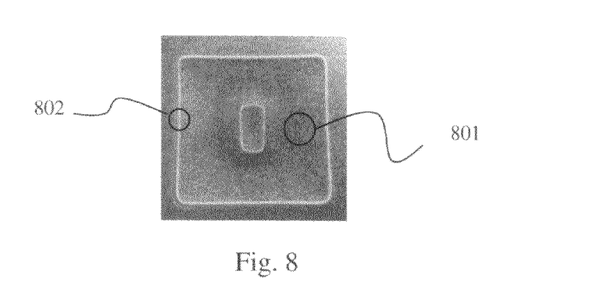
FIG. 8 is a second image formed in accordance with this invention similar to FIG. 1c.
Figure 9A:
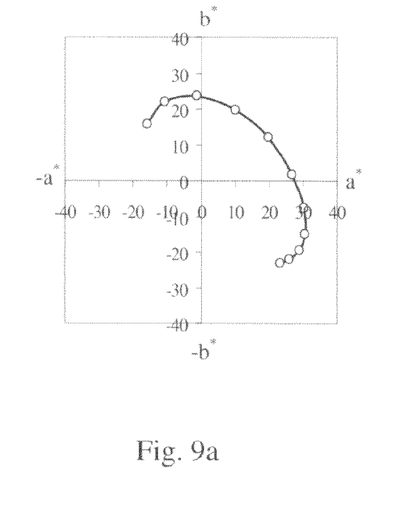
FIGS. 9a and 9b are color travel curves corresponding to the image of FIG. 8 showing the color in a region where the magnetic flakes are upstanding and in a region where all of the flakes are substantially parallel to the substrate.
Figure 9B:
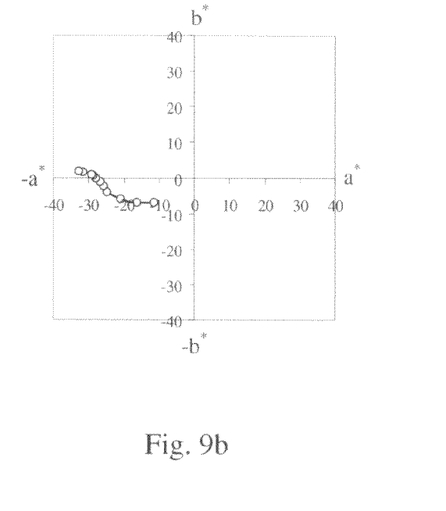

Referring now to FIG. 8 a second image 80 is shown wherein flakes are aligned in a same manner as in FIG. 1c with a same magnet providing a same magnetic field. In this image 80 standard interference Magenta/Gold (6.6 wt %) non-magnetic pigment and Gold interference magnetic pigment (13.3 wt %) were dispersed in clear Sericol ink vehicle, placed on the top of the magnet 20, aligned in the magnetic field and UV cured. Similarly to the first sample used to coat the first image 10, the area 801 where magnetic particles are vertical to the substrate has a shift of color from magenta to gold as shown in FIG. 9a with a change of observation angle from normal to 60 degrees. The area 802 shows a gold color at any observation angle. Area or region 801 shows the particles lying flat upon the substrate. Of course color shifting effects can also be seen in this region due to the multilayer color shifting flakes used.

Figure 10A:
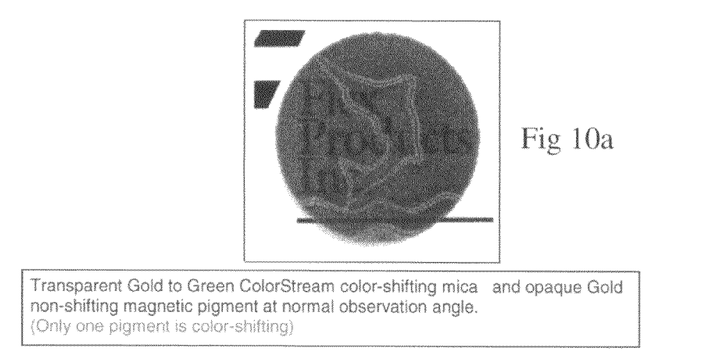
FIGS. 10a, 10b and 10c are images of a fish printed over black text on a white background with the ink containing a transparent color-shifting non-magnetic mica pigment and an opaque colored magnetic pigment.
Figure 10B:
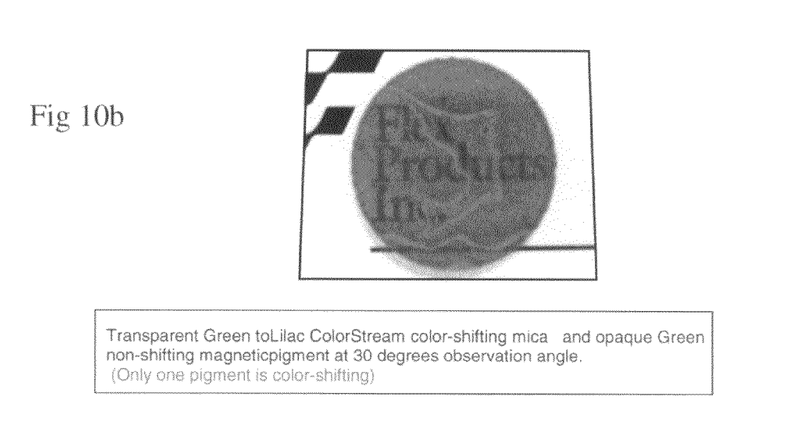
Figure 10C:
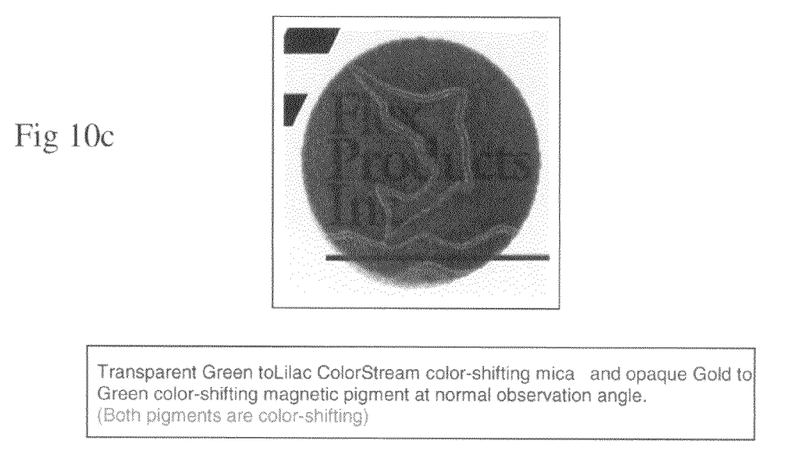

The flakes in accordance with this invention may be color shifting, non-color shifting, pearlescent diffractive, may bear covert symbols or indicia, and may be of a particular predetermined shape. In one embodiment shown in FIGS. 10a, 10b and 10c, the non-magnetic flakes are semitransparent, formed of semitransparent mica. In this instance, a background color of the substrate or a colored surface under the flakes would show through the semitransparent mica. In this instance the magnetically orientable flakes would likely dominate in color in the region where these flakes were planar to the substrate.

As an added form of security, in the instance that semitransparent nonmagnetic flakes are used, indicia such as text or logos can be provided under the region where the magnetic flakes are upstanding, exposing the indicia, text or logos through the semitransparent flakes.

What is claimed is:

1. A security device comprising:
    a coating forming an image having a first region and a second region adjacent to and visually distinguishable from the first region, wherein the coating is coated upon a substrate,
    wherein the coating is an ink or paint and
    wherein the coating comprises a mixture of a plurality of magnetically orientable flakes and a plurality of magnetically non-orientable flakes;
    wherein the magnetically orientable flakes and magnetically non-orientable flakes are substantially planar flakes each having two faces separated by edges defined by the thickness of the magnetically orientable flakes and magnetically non-orientable flakes;
    wherein the concentration of the mixture of the magnetically orientable flakes and the magnetically non-orientable flakes within the first region and second region is the same,
    wherein the magnetically orientable flakes within the first region are aligned so as to be substantially upstanding on or with respect to the substrate such that no faces of the magnetically orientable flakes can be seen when viewing the image and wherein the magnetically non-orientable flakes in the first region are substantially orthogonal to the substantially upstanding magnetically orientable flakes such that the magnetically non-orientable flakes are lying flat upon and parallel to the substrate so that the faces of the magnetically non-orientable flakes within the first region can be seen when viewing the image, and
    wherein the magnetically orientable flakes and magnetically non-orientable flakes within the second region are substantially parallel to the substrate so as to be lying flat upon the substrate and wherein the faces of the magnetically orientable flakes and magnetically non-orientable flakes within the second region can be seen within the second region when viewing the image,
    wherein a difference in appearance due to the orientation of the magnetically orientable flakes in the first region and the second region forms a visible contrast,
    wherein the edges of the magnetically orientable flakes in the first region are visible under magnification and wherein the faces of the magnetically orientable flakes are not visible and wherein one of the first or second regions forms a logo, insignia or text.

2. The security device as defined in claim 1 wherein—the first region is contiguous with—the second region and wherein a composition of the coating is the same in the first region and the second region.

3. The security device as defined in claim 2 wherein a hue of the magnetically orientable flakes and a hue of the magnetically non-orientable flakes are substantially different and wherein the faces of the magnetically orientable flakes have a first color and wherein the faces of the magnetically non-orientable flakes have a second color visually distinguishable from the first color.

4. The security device as defined in claim 3 wherein a color seen in the first region is the second color.

5. The security device as defined in claim 4 wherein a color seen in the second region appears different from the first color of the magnetically orientable flakes and different from the second color of the magnetically non-orientable flakes and is an average of the first color and the second color.

6. The security device as defined in claim 5, wherein a ratio of the magnetically orientable flakes to the magnetically non-orientable flakes is greater than or equal to 1.

7. The security device as defined in claim 1 wherein the magnetically non-orientable flakes are transparent and wherein the magnetically orientable flakes are opaque.

8. The security device as defined in claim 1 wherein the area of the first region is smaller than the area of the second region.

9. The security device as defined in claim 1, wherein one of the first or second regions forms a border enclosing the other of the first or second regions.

10. The security device as defined in claim 9 wherein a color of the second region is darker or lighter than a color of the first region.

11. The security device as defined in claim 1, wherein a perceived color of the first region where the magnetically orientable flakes are magnetically oriented normal to the substrate matches a color of the magnetically non-orientable flakes, while a perceived color of the second region where both of the magnetically orientable flakes and the magnetically non-orientable flakes are parallel to the substrate matches a color of the mixture of the magnetically orientable flakes and the magnetically non-orientable flakes.

12. The security device as defined in claim 1 wherein the magnetically non-orientable flakes are semi-transparent.

13. The security device as defined in claim 1 wherein at least some of the magnetically orientable or the magnetically non-orientable flakes are color shifting multilayer flakes.

14. A substrate having a single coating layer thereon, wherein the single coating layer forms an image and comprises magnetic and non-magnetic flakes fixedly disposed within an at least partially light transmissive binder, wherein the single coating layer is substantially uniform such that the magnetic and non-magnetic flakes are evenly distributed throughout the single coating layer, and wherein the magnetic flakes within a first region of the image are all aligned so to be upstanding and vertical to the substrate and wherein the non-magnetic flakes within the first region are substantially parallel to the substrate and orthogonal to the magnetic flakes, and wherein the magnetic and non-magnetic flakes in an adjacent second region are all substantially flat lying and parallel to the substrate, wherein a difference in color is seen between the first region and the second region, and wherein one of the first or second regions forms a logo, insignia or text.

15. The substrate having the single coating layer as defined in claim 14, wherein the single coating layer is formed in a single coating step.

16. The substrate having the single coating layer as defined in claim 14 wherein the faces of the magnetic flakes have a first color and wherein the faces of the non-magnetic flakes have a second color different from the first color.

17. The substrate having the single coating layer as defined in claim 14 wherein the magnetic flakes and the non-magnetic flakes have the same color.

18. The substrate having the single coating layer as defined in claim 14 wherein a ratio of the magnetic flakes to the non-magnetic flakes in the single coating layer is at least 2:1.

19. The substrate having the single coating layer as defined in claim 14 wherein at least some of the magnetic flakes or the non-magnetic flakes are color shifting multilayer flakes.

* * * * *